United States Patent [19]
Gallistel

[11] 3,921,189
[45] Nov. 18, 1975

[54] ZOOM LENS VIEW FINDER SYSTEMS
[76] Inventor: Albert F. Gallistel, 2933 Casco Point Road, Wayzata, Minn. 55391
[22] Filed: Oct. 11, 1974
[21] Appl. No.: 514,112

[52] U.S. Cl. ............... 354/220; 354/201; 354/221; 354/222; 354/223; 354/225
[51] Int. Cl.² .................. G03B 13/08; G03B 13/12
[58] Field of Search ........... 354/219, 220, 221, 222, 354/223, 224, 225, 199, 200, 201, 159

[56] References Cited
UNITED STATES PATENTS

| | | |
|---|---|---|
| 873,204 | 12/1907 | Ballou .................................. 354/201 |
| 2,526,144 | 10/1950 | Lawrence et al. ............... 354/220 X |
| 2,589,363 | 3/1952 | Foufoumis ........................... 354/220 |
| 2,737,844 | 3/1956 | Jerome et al. ....................... 354/221 |
| 3,083,628 | 4/1963 | Tsugawa ............................. 354/159 |
| 3,333,521 | 8/1967 | Daniel, Jr. ......................... 354/222 X |

FOREIGN PATENTS OR APPLICATIONS 915,523   7/1954   Germany ........................... 354/201

*Primary Examiner*—Joseph F. Peters, Jr.
*Attorney, Agent, or Firm*—Schroeder Siegfried Ryan & Vidas

[57] ABSTRACT

A camera with view finder for remote viewing in which an auxiliary view finder incorporating a fixed focus lens and a Fresnel lens are positioned within the camera to project an image corresponding to the image seen by the camera lens on a mirror at the top of the camera and available for viewing by an operator at the front or to the side of the camera. The mirror is rotatable so that it may be seen from varying positions remote from the camera. The improved view finder also provides for the use of a zoom lens and motor operation of the same with an adjustable mask associated with the view finder to restrict the portion of the panorama to that actually in focus within the camera and on the film to be exposed thereon. The drive system for the adjustable mask is operated by the zoom lens drive to simultaneously adjust the same. The purpose of this invention is to provide an image in the view finder that is substantially larger than the image that can be obtained with currently available zoom lenses. Zoom lenses are presently readily available only in sizes capable of covering a circle of a maximum diameter of about 44mm. In the view finder which is the subject of this invention, we wish the lens system to cover a circle of 100mm or more so that viewing at a distance from the camera is easily accomplished. In addition, the camera includes provisions for adjusting range and eliminating parallax error by coupling the view finder with the range adjustment of the camera lens to correct parallax error.

16 Claims, 5 Drawing Figures

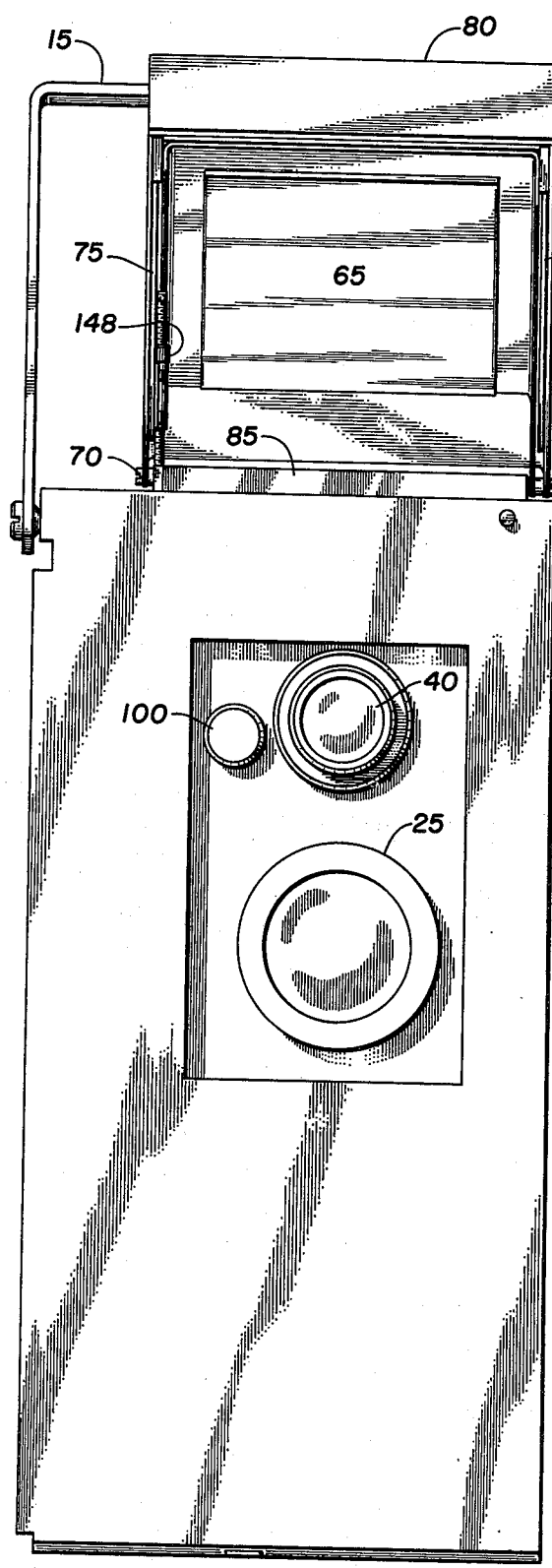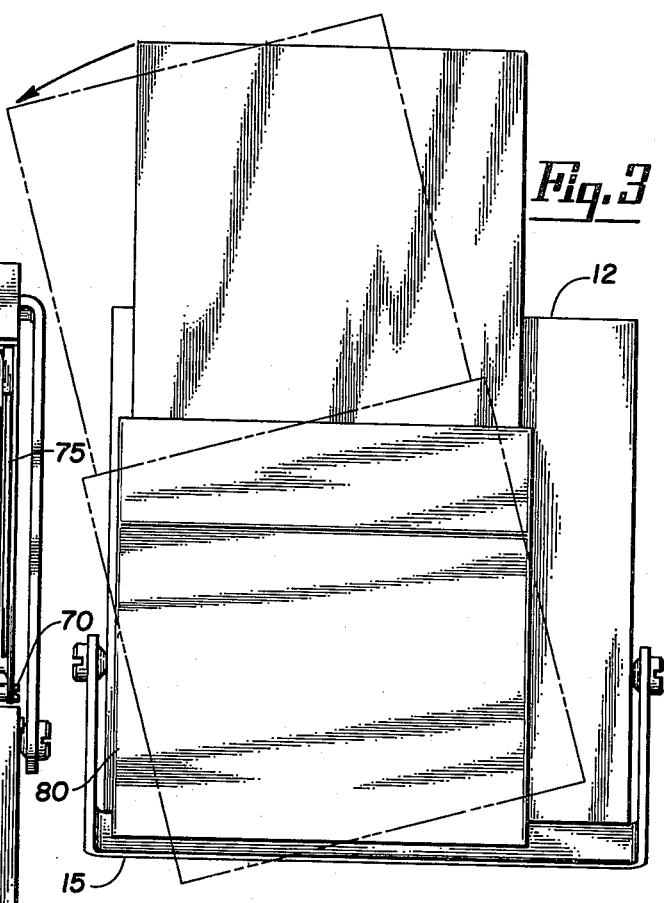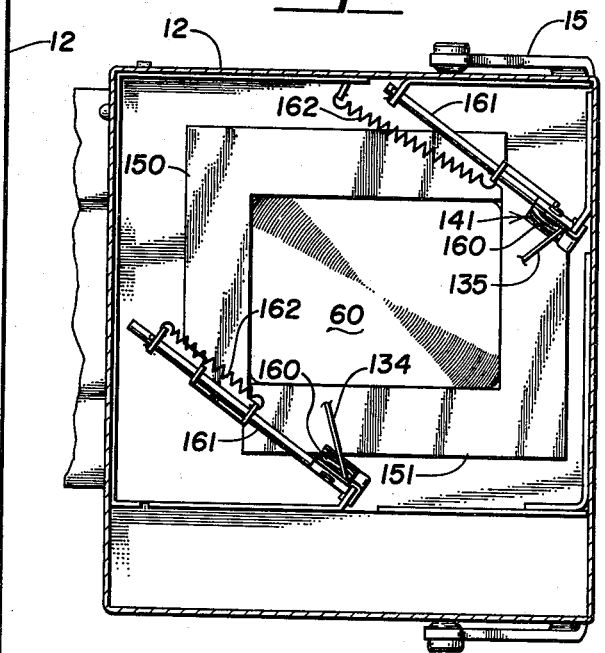

ZOOM LENS VIEW FINDER SYSTEMS

My invention relates to a camera with an improved view finder and more particularly to a camera with an auxiliary view finder which may be viewed from a remote point to provide an enlarged image and which is adjustable with the camera lens to provide a content or format of image corresponding to the image being photographed.

In camera equipment, a view finder is utilized for presenting to the operator a framing or delimiting of a panorama seen be the camera so that the operator may ascertain exactly what portion of the panorama will be recorded on the film by the camera lens. View finders associated with cameras have taken a variety of forms including a simple peep sight at the rear of the camera and confined with a wire frame near the lens of the camera. More complex view finders have been basically an auxiliary camera coupled to the photographic camera and which include means for either manually or automatically correcting for a parallax error which exists between the view finder and the camera lens because the same are not on the identical optical axis. Generally, view finders have been restricted for usage in connection with operator positions very close to the camera, usually behind or at the side of the camera and no existing view finder adequately provides for viewing of the camera image at a considerable distance from the camera and in particularly, from a position by an operator working in front of a camera and at a distance therefrom.

In many photographic activities, such as portrait photography, it is desirable for the photographer to be close to the subject to arrange and pose the subject for the correct photographic effect. This is particularly true with young children and babies wherein it is necessary for the photographer or operator to keep close contact with the subject for best results. The constant returning to the camera to check for the aiming and composition creates much delay and extra work for the photographer when the subject and camera are typically six or more feet apart. Failure to check the image in the camera or the composition of the picture leads to waste of film and additional consumed time. The present invention is particularly adapted for portrait photography in that it provides a view finder that is readily visible from several feet away, preferably in front or to the side of the camera and which provides an enlarged image that correctly shows the composition of the subject being photographed.

In portrait work and in conventional cameras, the size of the subject with respect to the picture being taken primarily is controlled by movement of the camera or the subject relative to one another. Thus, in head-only type portraits, the camera is moved close to the subject and conversely moved away from the subject for head and shoulders type portraits or even further for full photographs. This normally requires a great deal of movement of the camera and/or the subject back and forth with each movement requiring refocusing of the camera, all of which require time lost in shooting and physical effort on the part of the user or photographer. A well known type "zoom" lens may be used for this purpose to eliminate the problem of movement by adjustment of the focal length of the lens to change image size at will over a considerable range of sizes without requirement of camera movement or resizes without requirement of camera movement or refocusing of the camera. Generally, such "zoom" lens are used with "single lens reflex type" cameras in which the operator sees the image actually through the lens which takes the picture so that the need for a view finder is eliminated. Where an external view finder is to be used in connection with a zoom lens, it is obvious that adjustment of the view finder must take place with the adjustment of the zoom lens in order to maintain proper content and composition of the image in the view finder for various ranges of movement or settings. This could be accomplished by incorporating a zoom lens on the view finder, but it is difficult and costly to match lens so that they agree accurately over their entire range of movement.

In the present invention, an adjustable view finder is provided which may be incorporated with a zoom lens on a camera for portrait type photographic work in which the size of the image is adjusted in the view finder in association with lens movement or adjustment of focal length of the camera lens to match the viewed image with that taken by the camera. This feature is obtained by a simple and relatively inexpensive movable mask coupled with the zoom mechanism for providing a field of view that matches the view taken by the zoom lens which is provided with a relatively simple and inexpensive apparatus. This improved view finder provides an image which is enlarged for desired viewing of the operator and in addition provides a well-lighted picture composition in the view finder correlated with the adjustment of a variable focal length lens, such as a zoom lens. Therefore, in the present invention, I have provided an enlarged view finder with a camera which may or may not incorporate a zoom lens to enable viewing of the image by the operator from a point remote from the camera and which is adjustable with a zoom lens, when used, to provide a proper image field of view corresponding to the picture being taken. This enables a view finder to be used by an operator from a position in front or to the side of the camera but remote therefrom for ease in handling and working with the subject and for the purpose of eliminating time in resetting and re-checking the camera by returning to the same for portrait photography.

It is therefore the object of this invention to provide with a camera an improved view finder which may be viewed from a remote position with respect to the camera.

Another object of this invention is to provide in a camera a view finder of this type with an enlarged and well-lighted image which can be seen from in front or from beside the camera and remote therefrom to enable the operator to check camera alignment and picture composition without returning to the camera.

A further object of this invention is to provide an improved camera and view finder combination in which parallax correction between the view finder and the camera lens are provided automatically with camera range adjustment.

Another object of this invention is to provide a view finder of this type for use with a zoom lens.

A still further object of this invention is to provide an improved camera with view finder incorporating a zoom lens in which the image size in the view finder is adjusted by an adjustable mask coupled to the adjustment of the zoom lens.

A further object of this invention is to provide a camera of this type utilizig a motor operated zoom lens capable of operation from a point remote from the camera and with adjustment of image size in the view finder in accord with operation of the zoom lens.

These and other objects of this invention will become apparent from the reading of the attached description together with the drawings wherein:

FIG. 2 is a front elevation view of a camera of FIG. 1 with a view finder extended;

FIG. 3 is a top view of the camera of FIG. 1 with a view finder oriented in a modified position;

FIG. 4 is a sectional view of the camera taken along the lines 4—4 in FIG. 1; and;

Figure 1:
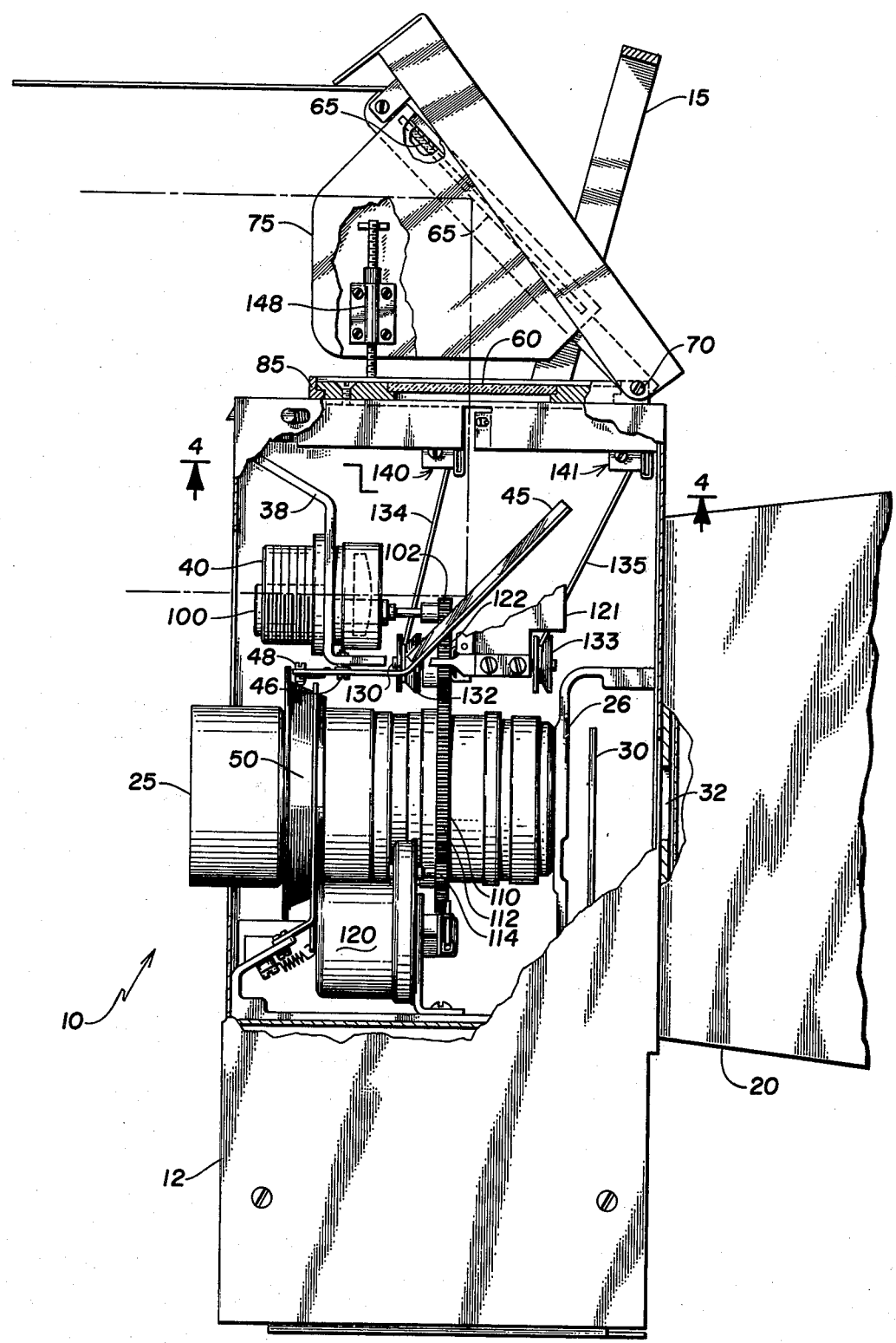
FIG. 1 is a side elevational view of the improved camera with a remote view finder having parts broken away.

As will be seen in FIGS. 1, 2, and 3, the camera 10 is shown as including a generally rectangular box-like housing 12 having a carrying handle 15 on the top surface of the same and with a film pack housing 20 at the rear side of the same. The actual shape of the camera and the housing of the same may take varying forms within the scope of the present invention, as will be hereinafter defined. The camera lens 25 is positioned through the front of the camera and mounted internally in the camera in a journaled and threaded housing 26. Lens 25 as will be hereinafter noted, may be an adjustable focal length lens or a zoom lens. The lens is mounted in the housing 26 with a shutter assembly 30 positioned behind the same to selectively direct light through the lens on to an opening 32 in the film magazine 20 for exposing the film therein. The details of the film pack and shutter assembly together with the operating structure for the same are omitted for simplicity since they may take varying forms. Preferably the film magazine is of the type for holding a large supply of film enabling the operator to take a large number of shots. The particular camera may have alternate uses but it is particularly adapted for use in portrait photography.

Associated with the camera is a view finder comprised of an auxiliary or view finder lens 40 positioned on a flange portion 38 of housing 12 in the front wall of the housing and projecting therefrom offset from the lens 25 of the camera. The view finder lens is preferably a fixed focal length lens and light therefrom will fall on a first view finder mirror 45 positioned internally within the camera and aligned with the optical axis of the lens 40. The mirror 45 is pivoted through a pivot construction 46 and has an adjustable linkage member or follower 48 coupled thereto which is a cam follower riding on a cam 50 positioned on the lens 25. Thus, with range adjustment of the lens 25 in the camera through manipulation or rotation of the lens 25 to focus on an image, movement of the cam 50 attached thereto will move the cam follower 48 to adjust the linkage or pivot of the mirror 25 to correct for parallax error between the view finder and the optical axis of the camera 25.

In the top of the camera and through an aperture therein is positioned a second lens which is preferably a Fresnel lens 60. The fixed lens and the Fresnel lens combine to provide an image which at maximum masking is approximately 2 ½ times the size of the image seen by the film or passing through the main camera lens 25. The Fresnel lens directs light on to a second pivoted mirror 65 which is pivotally mounted on the top of a camera in a top view finder assembly 68 through a pivot structure indicated at 70. Light from the view finder lens 40 will be reflected to the first mirror 45 and on to the Fresnel lens where it will be directed on to the second mirror 65 so that it may be viewed providing an increased amount of light to provide a well defined image for the operator. The view finder assembly includes side plates 75 which fold within the view finder cover 80, the latter being mounted on a pivoted ring 85 to allow rotation of the mirror 65, plate 75, and cover 80 so that light from the Fresnel lens 60 may be viewed from the varying angles in front of the camera as indicated in FIG. 3. Thus, the view finder assembly includes the side plate and cover which are open to define an enclosed shadow box type housing exposing the second mirror 65 which pivots as the cover 80 is raised to a predetermined angle enabling the image received by the view finder to be viewed from a position in front of the camera and several feet away, such as 6 – 8 feet, with sufficient light to well define the image seen by the camera lens and in an enlarged form. The assembly is rotatable so that varying positions to the side of the camera aside from the optical axis of the camera lens permits the operator to work with a subject on portrait photography and stand aside while viewing the image in the camera preparatory to the shooting so that the proper picture or portrait composition may be obtained. The operator will have a remote control cord, indicated generally at 90, in FIG. 5, which will enable him to operate the shutter mechanism of the camera when desired picture composition is obtained.

The view finder lens together with the Fresnel lens provides an image to be viewed by the operator which at maximum is approximately 2 ½ times the size of the film image. The lens 40 of the view finder is a single focal length lens and its focal length is chosen to provide an enlarged image for easy viewing. The Fresnel lens together with the first and second mirrors enables the image to be projected to the top of the camera in an enlarged form so that it may be viewed by an operator from in front of the camera or to any side of the same but remote from the camera. The Fresnel lens replaces a conventional ground glass in the conventional camera obscura type view finder and permits increased lighting in the view finder to provide an image which may be viewed from a remote point.

Where the lens 25 is a zoom lens or an adjustable focal length lens, it may be used for increasing the image size or reducing the size of the panorama viewed by the lens to increase the size of the subject without movement of the camera. In the present invention, a suitable ring 110 is mounted on the rotatable portion of the zoom lens, the ring having a gearing 112 on the surface of the same. Mounted within the housing 12 is a drive motor 120 which has a suitable pinion gear 114 on the shaft extremity of the same coupling the geared surface 112 with the ring 110 attached to the rotatable portion of the zoom lens. This will enable the motor to drive the zoom lens automatically and with the motor being controlled through a suitable electric circuit to the operator's attachment cord 90 so that it may be operated by an operator remote from the camera. Positioned within the camera housing 12 is a flange member 121 which mounts and journals a shaft 130. A pinion gear 122 is mounted on the shaft 130 which meshes with the geared surface 112 of the ring 110 on the zoom lens. The shaft has a pair of pulley members 132, 133, mounted thereon which are driven from the shaft and gear 122. The pulley members have cables 134, 135, respectively attached to and positioned to the same which wind on the pulley members 132, 133, and lead to additional pulley assemblies 140, 141, in the upper portion of the camera housing 12 to operate masking blades 150, 151, positioned in the under surface of the upper portion of the top of the camera case adjacent the Fresnel lens and the opening in which it is mounted. The mounting blades are "L" shaped in form and are positioned immediately behind the Fresnel lens and coupled through pulleys 160, slide member 161, and springs 162, mounted on the under surface of the camera housing to move the "L" shaped masking blades as the cables are shortened or extended and with or against the bias as the cables are shortened or extended and with or against the bias of the springs 162 toward and away from one another. The two blades define a rectangular opening behind the Fresnel lens to decrease or increase the size of the image projected through the view finder. Thus, when the zoom lens is adjusted to increase a portion of the subject on the film the view finder masking blades reduce the size of the rectangle and hence, the size of the image projected through the Fresnel lens to the upper mirror of the view finder to reduce the field viewed by the operator consistant with the image to be projected on the film. Thus, the same area of field will always be covered by the view finder and the camera lens. The drive of the pulleys and slides are mounted in the under surface of the housing so that the blades will move in a manner to reduce or increase the size of the rectangle with the sides thereof maintaining the parallelism defining the rectangle. With such adjustment, the same amount of light intensity is projected on the Fresnel lens and the mirror projects an image readily viewed by the operator at a position remote from the camera.

Positioned on the face of the housing 12 of the camera is an adjusting knob 100 with a shaft upon which is mounted a gear 102. Gear 102 meshes with gear 122 on shaft 130 to permit manual rotation of the shaft for the zoom lens adjustment with mask adjustment, as indicated above, independent of the operation of the motor 120.

In portrait photography, the camera is normally used as a fixed focused camera and such that there is very little need for changing parallax correction because the camera is not moved and parallax correction of the view finder remains constant. If, however, it is desired to refocus the camera and operate a different distance from the subject, than the parallax correction is required. This is affected by rotation of the camera lens 25 in the lens mounting 26 which rotation will effect movement of the cam mounted therein to operate through the cam follower and tilt the inner mirror 45 of the view finder. This adjustment will provide a shift in the axis of the view finder so that it is changed to intersect the camera axis as defined by the axis of the camera lens 25 at a point where the lens 25 is in focus.

In normal operation, a view finder of the straight-through type requires that the operator return to the camera to check the composition of the picture and the location of the image. With the present invention, the adjustable view finder may be viewed from a point in front of the camera enabling the operator to work with the subject and operate the shutter at the time when picture composition is correct without returning to the camera. The universal mounting of the view finder permits the photographer or operator to operate in any position around the camera since the outer mirror is mounted on a rotatable ring and at an angle of 45° so that it may be viewed by the operator looking directly at the same and from various positions around the camera. The location of the outer mirror changes the optical axis to the horizontal plane. The internal mirror bends the optical axis 90° up through the Fresnel lens which lies in the horizontal plane. Thus, the second mirror becomes a view screen from any aximuth location with respect to the camera by rotating the viewing mirror aaboout a vertical optical axis as indicated in phantom in FIG. 3. The viewing mirror is located within the hood or enclosure defined by the side plates and cover plate to define a shadow box which rotates with the mirror and shelters the fresnel lens from the surrounding light which would otherwise interfere somewhat in the viewing. The upper or second mirror is adjustable to arrange slightly above or below the 45° point through an adjusting mechanism 148 coupled thereto which permits the image to be directed upwardly or downwardly to compensate for various height settings of the camera for short or tall operators. The fact that the fixed focal length lens 40 of the view finder is not focused directly in the plane of the Fresnel lens 60 is important since it permits adjustment of the size of the viewer image by locating the object closer or farther from the Fresnel to compensate for small focal length differences.

Figure 5:
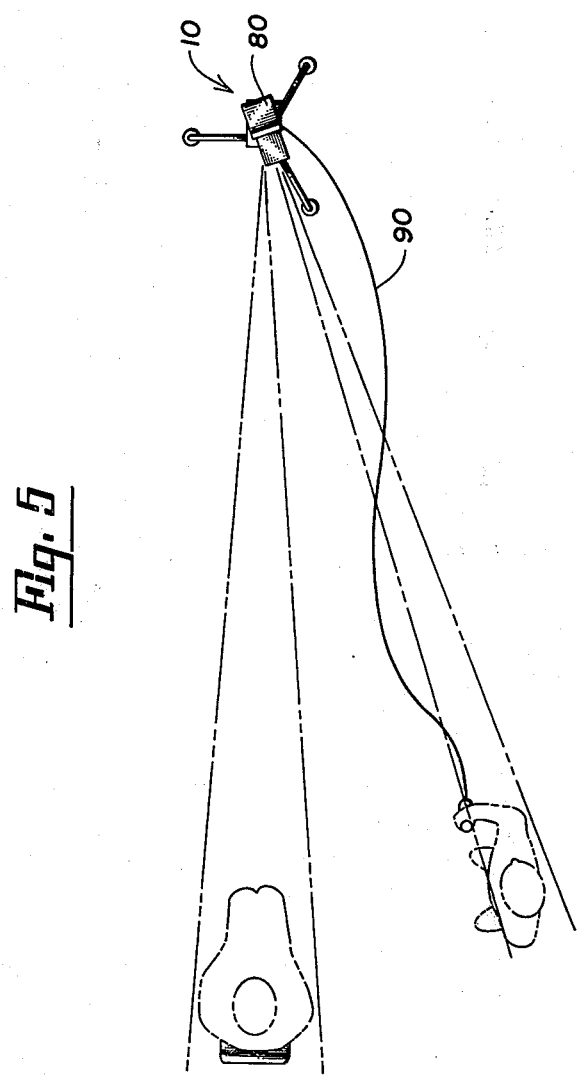
FIG. 5 is a schematic view of a camera showing the relationship of an operator with respect to operation of the same.

As seen in the perspective view in FIG. 5, the improved camera with the view finder for remote viewing may be operated by a photographer from the front of the camera allowing the operator to work closely with the subject, particularly in portrait photography of small children and to stay in the vicinity in the taking of the pictures. The view finder permits the impression of the image or subject on the mirror enclosed in the shadow-box typed hood of the view finder receiving light from the view finder main lens and Fresnel lens to enable the operator to check picture composition before operating the shutter to eliminate loss of time and wasted film. The hand control cord, indicated at 90, will include a shutter operator mechanism or shutter switch as well as the switch control for operating the zoom lens motor to change the setting of the zoom lens whenever it is desired to focus specifically on a portion of the subject being viewed by the camera lens and to photograph the same. Thus, operation of the zoom lens will permit full length portrait, a bust size portrait or a head-only portrait of a subject by operating the zoom lens. As the motor drives the adjustable portion of the zoom lens, it also adjusts the cable mechanism moving the mask members to reduce or increase the size of the opening beneath the Fresnel lens and proportionally reduce or increase the size of the image seen by the view finder to correspond with the image focused on the film pack which will be exposed with operation of the shutter. The zoom lens may also be manually adjusted from the knob 100 on the face of the camera with the same operation of the mask in the view finder. Thus, the improved camera permits freedom for the operator to work with the subject and to view the subject or the image to be taken by the camera from a remote point enabling the freedom of movement of the operator leading to an economy in both time and film with respect to portrait photography. It will be understood that the improved type of camera need not be restricted to portrait type photography or that the camera need be a still camera since the invention may well be used on a motion picture camera in which the operator may view the subject from a point remote from the camera.

Therefore, in considering this invention, it should be remembered that the present disclosure is illustrative only and the scope of the invention should be determined by the appended claims.

What we claim is:

1. A camera with a view finder for remote viewing comprising, a camera including an adjustable lens with a shutter and film pack positioned within a camera housing and with the adjustable lens projecting through the front wall thereof, a view finder lens positioned through the front wall of the camera and focused on a first tiltable mirror positioned within the housing, a Fresnel lens positioned on the top of the camera and aligned with the tiltable mirror, a foldable housing including a second tiltable mirror positioned adjacent the Fresnel lens on the top of the camera and permitting viewing of the image seen by the adjustable lens of the camera from a position remote from the camera; and means coupling the tiltable mirror within the housing to the adjustable lens to adjust for parallax error between the camera lens and the view finder lens.

2. The camera with a view finder for remote viewing of claim 1 in which the second mirror is pivoted about a position adjacent the Fresnel lens and in which the sides of the view finder cover fold on the second mirror with the top folding over the sides to enclose the same.

3. The camera with view finder for remote viewing of claim 2 and including means for adjusting the fixed angle of pivot of the second mirror connected between said second mirror and the top of the housing.

4. The camera with a view finder for remote viewing of claim 1 and including means mounting the view finder cover together with the second tiltable mirror to pivot the same about a vertical axis on the top of the camera housing.

5. The camera with a view finder for remote viewing of claim 1 in which the means coupling the first tiltable mirror to the adjustable lens of the camera includes a cam on the camera lens and a cam follower engaging the first tiltable mirror for pivoting said first tiltable mirror with adjustment of the lens.

6. The camera with a view finder for remote viewing of claim 1 in which the adjustable lens of the camera is adjustable for range and adjustable further to focal length as a zoom lens.

7. The camera with a view finder for remote viewing of claim 6 in which the zoom portion of the camera lens is adjusted by a motor drive controlled by a power source and adapted to be operated by a remote control cable.

8. The camera with a view finder for remote viewing of claim 7 and including means associated with the Fresnel lens and coupled to the motor drive of the zoom lens for changing the mask opening through the Fresnel lens for light reflected from said first mirror to change the image size in the view finder in accord with the setting of the zoom lens.

9. The camera with a view finder for remote viewing of claim 8 in which the means associated with the Fresnel lens are a pair of "L" shaped opening defining members movable toward and away from one another and coupled through gearing and cabling to the motor drive of the zoom lens to vary the light opening adjacent the Fresnel lens.

10. The camera with a view finder for remote viewing of claim 8 in which the image size changing members are "L" shaped masking members positioned together to define a rectangular opening adjacent the Fresnel lens with the bracket members being guided along axes to decrease the size of the rectangular opening with adjustment of the zoom lens without changing the proportions of the rectangle.

11. The camera with a view finder for remote viewing of claim 8 and including an adjustment knob coupled to the zoom lens to operate the zoom lens manually from the front of the camera independent of the motor and adjust the size of the image size through adjustment of the image change means.

12. The camera with a view finder for remote viewing comprising, a camera including an adjustable focal length lens having a shutter member associated therewith and a film magazine positioned behind the shutter member and adjustable to expose the film with operation of the camera; said lens, shutter member and film magazine being positioned within a camera housing and with the adjustable focal length lens projecting through the front wall thereof; a view finder including a view finder lens positioned in the front wall of the camera; said view finder including a first tiltable mirror positioned within the housing; a second lens positioned in the top of the camera and aligned with the first tiltable mirror; a second tiltable mirror positioned on the top of the housing adjacent the second lens and receiving light from the first lens reflected from the first tiltable mirror and through the second lens, means coupling the adjustable lens of the camera to the first tiltable mirror to tilt the mirror with changes in range adjustment of the adjustable lens to correct for parallax error between the adjustable lens and the view finder lens; an adjustable mask formed of size opening changing members positioned within the housing and behind the second lens and adapted to vary the size of the image seen from the view finder, and means coupling the adjustable portion of the adjustable focal length lens to said mask adjusting the image size in the view finder to couple the adjustable lens with the view finder and present in the second tiltable mirror an image corresponding in format and content to that seen by the film with focal length adjustment of the camera lens.

13. The camera with view finder for remote viewing of claim 12 in which the view finder lens is a fixed focal length lens and the second lens of the view finder is a Fresnel lens.

14. The camera with a view finder for remote viewing of claim 13 and including enclosable cover means positioned over the second mirror and tiltable with the second mirror to expose the view finder.

15. The camera with the view finder for remote viewing of claim 12 in which the adjustable focal length lens is a zoom lens and including a motor means coupled to the adjustable portion of the zoom lens for adjusting the same and for adjusting the mask members of the view finder.

16. The camera with view finder for remote viewing of claim 15 in which the mask members of the view finder are a pair of "L" shaped members positioned to define the rectangular opening behind the second lens and including cable drive means for moving the members toward and away from one another to change the size of the opening behind the second lens and the size of the image seen by the view finder with adjustments of the adjustable focal length lens.

* * * * *